US012768794B2

(12) United States Patent
Manzi

(10) Patent No.: US 12,768,794 B2
(45) Date of Patent: Oct. 20, 2026

(54) TEST STRIP CASSETTE, MONITORING DEVICE AND METHOD FOR FABRICATING A TEST STRIP CASSETTE

(71) Applicant: ams-Osram AG, Premstätten (AT)

(72) Inventor: Giuliano Manzi, Gratwein-Straßengel (AT)

(73) Assignee: ams-Osram AG, Premstätten (AT)

( * ) Notice: Subject to any disclaimer, the term of this patent is extended or adjusted under 35 U.S.C. 154(b) by 656 days.

(21) Appl. No.: 18/253,539

(22) PCT Filed: Nov. 18, 2021

(86) PCT No.: PCT/EP2021/082137
§ 371 (c)(1),
(2) Date: May 18, 2023

(87) PCT Pub. No.: WO2022/106537
PCT Pub. Date: May 27, 2022

(65) Prior Publication Data

US 2024/0019377 A1 Jan. 18, 2024

(30) Foreign Application Priority Data

Nov. 20, 2020 (DE) ........................ 102020130774.8

(51) Int. Cl.
*G01N 21/78* (2006.01)
*G01N 21/77* (2006.01)

(52) U.S. Cl.
CPC ..... *G01N 21/78* (2013.01); *G01N 2021/7759* (2013.01); *G01N 2021/7796* (2013.01)

(58) Field of Classification Search
CPC ... G01N 2021/7759; G01N 2021/7796; G01N 21/78; G01N 21/8483; G06F 9/30036; G06F 9/5061; G06F 9/544
See application file for complete search history.

(56) References Cited

U.S. PATENT DOCUMENTS 4,509,859 A 4/1985 Markart et al.
4,943,522 A 7/1990 Eisinger et al.
(Continued)

FOREIGN PATENT DOCUMENTS

CN 113615094 A 11/2021
EP 2905607 A1 8/2015
(Continued)

OTHER PUBLICATIONS ams AG, AS7341 11-Channel spectral sensor Evaluation Kitv1, Mar. 8, 2019, 34 pages.
(Continued)

*Primary Examiner* — Kathryn Elizabeth Limbaugh
(74) *Attorney, Agent, or Firm* — MH2 Technology Law Group LLP

(57) ABSTRACT

A test strip cassette includes a housing defining a first opening being configured to receive a sample liquid, the housing further defining a second opening configured to provide an optical path into the housing, and a spacer structure. It further includes a carrier including at least one photodetector, the at least one photodetector being aligned with the second opening of the housing. It further includes a test strip including a sample pad aligned with the first opening and at least one active area aligned with the second opening and the at least one photodetector. The housing encloses the carrier and the test strip, such that the test strip is spaced from the carrier by the spacer structure and arranged between the second opening and the carrier.

20 Claims, 9 Drawing Sheets

(56) References Cited

U.S. PATENT DOCUMENTS

| | | | | |
|---|---|---|---|---|
| 6,485,982 | B1 | 11/2002 | Charlton | |
| 6,663,833 | B1 | 12/2003 | Stave et al. | |
| 6,841,159 | B2 | 1/2005 | Simonson | |
| D509,901 | S | 9/2005 | Phelan et al. | |
| 7,044,919 | B1 | 5/2006 | Catt et al. | |
| D523,964 | S | 6/2006 | Phelan et al. | |
| 7,090,803 | B1 | 8/2006 | Gould et al. | |
| D530,825 | S | 10/2006 | Lee et al. | |
| 7,141,212 | B2 | 11/2006 | Catt et al. | |
| 7,144,742 | B2 | 12/2006 | Boehringer et al. | |
| D557,815 | S | 12/2007 | Lee et al. | |
| 7,315,378 | B2 | 1/2008 | Phelan et al. | |
| 7,317,532 | B2 | 1/2008 | Sharrock et al. | |
| D576,737 | S | 9/2008 | Lee et al. | |
| D672,880 | S | 12/2012 | Laverack et al. | |
| D675,336 | S | 1/2013 | Laverack et al. | |
| D676,144 | S | 2/2013 | Laverack et al. | |
| D676,569 | S | 2/2013 | Laverack et al. | |
| 8,399,261 | B2 | 3/2013 | Kabir et al. | |
| D694,903 | S | 12/2013 | Laverack et al. | |
| D698,937 | S | 2/2014 | Laverack et al. | |
| 8,865,088 | B2 | 10/2014 | Brewster et al. | |
| D735,351 | S | 7/2015 | Laverack et al. | |
| D739,417 | S | 9/2015 | Laverack et al. | |
| 9,638,704 | B2 | 5/2017 | Raj et al. | |
| 2005/0221504 | A1 | 10/2005 | Petruno et al. | |
| 2007/0064220 | A1 * | 3/2007 | Stock | G01N 21/8483 356/417 |
| 2012/0321519 | A1 | 12/2012 | Brown | |
| 2015/0226736 | A1 | 8/2015 | Nguyen et al. | |
| 2015/0241455 | A1 | 8/2015 | Parsons | |
| 2019/0056329 | A1 * | 2/2019 | Low | B01L 3/502753 |
| 2022/0150438 | A1 | 5/2022 | Cotteleer | |

FOREIGN PATENT DOCUMENTS

| | | | |
|---|---|---|---|
| EP | 3713092 | A1 | 9/2020 |
| EP | 3772646 | A1 | 2/2021 |
| WO | 2006073500 | A2 | 7/2006 |
| WO | 2008098722 | A1 | 8/2008 |
| WO | 2020187482 | A1 | 9/2020 |

OTHER PUBLICATIONS ams AG, AS7341—11-Channel Spectral Color Sensor, general description, May 20, 2019, 2 pages.

ams AG, AS7341—11-Channel Spectral Color Sensor, Overview, May 20, 2019, 2 pages.

FineXT 5205, The Ideal Solution for Customized Production | Finetech, Apr. 18, 2019, 4 pages, https://www.finetech.de/knowledge/technicalpapers-bonding/rfid-assembly/.

Wolff, RFID assembly on flexible substrates | Finetech, Aug. 2, 2019, 4 pages, https://www.finetech.de/products/inetechproduct-overview/automated-flexible-bondingplatform-finex-5205/.

SL-Produktionslinien fur Smart Labels, MELZER, May 14, 2019, 4 pages, https://www.melzermaschinenbau.de/anwendungen/smarte-produkte/smart-labels/.

Inlay Assembly, Muehlbauer, May 14, 2019, 2 pages, https://www.muehlbauer.de/products/semiconductor-related-products/rfid-smart-label/inlayassembly/.

Strap Attach System, Muehlbauer, May 14, 2019, 1 page, https://www.muehlbauer.de/products/semiconductor-related-products/rfid-smart-label/inlayassembly/strap-technology/strap-attach-tma-15000/.

Corum, C., A primer on 'flip chip' manufacturing techniques for smart card ICs, Apr. 4, 2019, 4 pages, https://www.secureidnews.com/news-item/aprimer-on-flip-chip-manufacturing-techniquesfor-smart-card-ics/.

OSRAM Opto Semiconductors GmbH Datasheet, LW Q38E, Chipled 0603, May 28, 2019, 23 pages.

Pristauz, H., RFID Chip Assembly For 0.1 Cents?, Smart Cards & RFID, Sep. 2006, 46 pages.

German Search Report dated Nov. 9, 2021, DE Application No. 102020130774.8, 10 pages.

International Search Report dated Mar. 15, 2022, PCT Application No. PCT/EP2021/082137, 3 pages.

Chinese Office Action issued in corresponding Chinese Patent Application No. 2021800669907 dated Jan. 5, 2026, with English language translation, 14 pages.

Qiuli Mao Chinese Office Action issued in corresponding Chinese Patent Application No. 2021800669907 dated Mar. 27, 2026, with English language translation, 13 pages.

* cited by examiner

TEST STRIP CASSETTE, MONITORING DEVICE AND METHOD FOR FABRICATING A TEST STRIP CASSETTE

CROSS-REFERENCE TO RELATED APPLICATIONS

The present application is a national stage entry from International Application No. PCT/EP2021/082137, filed on Nov. 18, 2021, published as International Publication No. WO 2022/106537 A1 on May 27, 2022, and claims priority to German Patent Application No. 10 2020 130 774.8, filed Nov. 20, 2020, the disclosures of all of which are hereby incorporated by reference in their entireties.

FIELD OF THE INVENTION

The present disclosure relates to a test strip cassette, a monitoring device and a method for fabricating a test strip cassette.

BACKGROUND OF THE INVENTION

A test strip cassette is a part of a monitoring device. The part can be inserted before a test or measurement and removed after the test or measurement. The monitoring device is typically portable and, thus, can be used for point-of-care applications for medical diagnostics and environmental tests. The test strip cassette can be used for a lateral flow test. The test strip cassette comprises a test strip of porous material and uses the capillary action of the porous material and its ability to bind marker molecules.

A sample liquid such as water, urine, blood or another liquid is provided to the test strip. The sample liquid flows using the capillary effect of the porous material and performs a chemical reaction. Typically, the chemical reaction results in a change of color at a predetermined active area of the porous material. The active area may have the form of a narrow or broad line. Often there are reactions at two active areas, respectively lines, of the porous material. Typically, change of color is monitored by visual inspection. These class of tests have several advantages, but there are still some disadvantages related e.g. to sensitivity and multi-analyte detection as well as complicated assembly processes. Finding a solution for these drawbacks may bring more tests to a home environment.

The following is a non-exhaustive list of patent and non-patent literature on the state of the art in lateral flow testing devices: US 2012/0321519 A1; EP 2905607 A1; U.S. Pat. No. 9,606,115 B2; US 2008/0171397 A1; U.S. Pat. Nos. 5,580,794 A; 7,220,597 B2; 9,243,997 B2; 7,317,532 B2; 7,315,378 B2; 7,044,919 B1; 7,141,212 B2; US 2005/0250141 A1; US 2006/0263907 A1; WO 2008/098722 A1; US 2005/0227371 A1; US 2015/0241455 A1; US 2006/0132786 A1; U.S. Pat. Nos. 6,485,982 B1; 6,663,833 B1; 6,841,159 B2; 7,090,803 B1; 7,144,742 B2; 8,399,261 B2; 8,865,088 B2; 9,638,704 B2; WO 2006/073500; U.S. Pat. No. 4,943,522 A; Caputo et al.: "Smart thin layer chromatography plate", Lab Chip, 2007, 7, 978-980.

It is an object to provide a test strip cassette, a monitoring device and a method for fabricating a test strip cassette that allow an efficient read-out of measurement results and effective assembling.

These objects are achieved by the subject-matter of the independent claims. Further developments and embodiments are described in the dependent claims.

SUMMARY OF THE INVENTION

In an embodiment, a test strip cassette comprises a housing. The housing defines a first opening being configured to receive a sample liquid and a second opening configured to provide an optical path into the housing. The housing further comprises a spacer structure.

Furthermore, the test strip cassette comprises a carrier. The carrier comprises at least one photodetector, the at least one photodetector being aligned with the second opening of the housing.

The test strip cassette further comprises a test strip. The test strip comprises a sample pad aligned with the first opening and at least one active area aligned with the second opening and the at least one photodetector.

The housing encloses the carrier and the test strip, such that the test strip is spaced from the carrier by the spacer structure and arranged between the second opening and the carrier.

The test strip with the at least one active area and the carrier with the at least one photodetector have both fixed positions within the housing. The at least one photodetector, the at least one active area and the second opening are aligned with each other. This can mean that in a vertical direction, which runs perpendicular to a main plane of extension of the carrier, the at least one active area is arranged between the photodetector and the second opening of the housing. In lateral directions which run parallel to the main plane of extension of the carrier, the region of the at least one photodetector overlaps the region of the second opening and the region of the at least one active area. Thus, an optical path is provided such that light can be transmitted through the second opening and the active area of the test strip. The at least one photodetector under the at least one active area can detect the transmitted light.

There might be a cavity between the carrier and the test strip at a location where the at least one photodetector and the at least one active area is present. In lateral directions, the cavity is delimited by the housing, in particular by the spacer structure. In the vertical direction the cavity is delimited by the carrier on a bottom side and by the test strip on an upper side. The cavity can be filled with air or a gas.

The sample pad is aligned with the first opening of the housing. This can mean that in the vertical direction the sample pad is arranged under the first opening. In the lateral directions the region of the sample pad has an overlap with the region of the first opening. Thus, the sample liquid can be inserted via the first opening onto the sample pad of the test strip.

Since both the carrier and the test strip are located inside the housing, a distance from the photodetector to the active area is short. The location of the at least one photodetector is predetermined with respect to the at least active area resulting in a high efficiency and reproducibility for detecting light transmitted or emitted by the at least one active area. However, the at least one photodetector is not directly attached to the test strip, for example by flip-chip bonding. Instead, the at least one photodetector is arranged on a separate carrier under the test strip. In that way the fabrication process is facilitated as no complicated flip-chip techniques are required. Thus, the fabrication process can be realized very cost-effective. The test strip cassette can be free from a light source. This can in particular mean that no light source may be arranged inside the housing, for example on the carrier. A light source for transmittance measurements may be comprised by an external reading device, as described below.

In an embodiment, the sample pad of the test strip is configured to absorb the sample liquid and to forward the sample liquid towards the at least one active area.

In an embodiment, the at least one active area may each have the form of a line, a square, a rectangle, a dot, a circle or an ellipse. A plurality of active areas may be arranged like a matrix, e.g. as a matrix of dots or squares. Such active areas may have different colors or may have identical colors. At least two active areas may have different colors. At least two active areas may have identical colors.

The second opening of the housing may also be called test opening. In an embodiment, the housing may comprise more than one test opening. For example, the housing comprises an additional test opening which is aligned with an additional active area of the test strip and/or with an additional photodetector on the carrier.

In an embodiment, the test strip comprises a porous material, in particular nitrocellulose, which is configured to transfer the sample liquid from the sample pad to the at least one active area. The active area of the porous material is provided with a chemical substance, typically a chemical compound, which reacts with a component of the sample liquid. The component may be an analyte included in the sample liquid.

The porous material may comprise nitrocellulose. The porous material may be bibulous. The porous material may be covered by a film. The film may protect the porous material. The film may be transparent or translucent. Transparent may be named also optically clear. The porous material may have a specific ratio of pore size, porosity and thickness plus a dedicated chemical treatment. Advantageously, the capillary action of the porous material can be used to transport the sample liquid.

The sample pad of the test strip may provide the sample liquid to the porous material directly or via a conjugate pad of the test strip. The conjugate pad includes e.g. a chemical substance (typically a chemical compound) designed for reaction with an analyte included in the liquid.

In an embodiment, the test strip comprises an absorbing pad for absorbing excess liquid from the porous material.

In an embodiment, the sample pad, the conjugate pad and the absorbing pad are also realized by a porous film or a porous layer, such as made of nitrocellulose.

In an embodiment, the porous material including the sample pad, the conjugate pad and the absorbing pad are arranged on a first side of a substrate. The substrate may be fabricated as a backing card, for example as a plastic adhesive backing card. The substrate may be optically transparent. By using the substrate the test strip may exhibit an enhanced stiffness. Moreover, the test strip can be built in a stacked structure.

In an embodiment, the at least one photodetector is arranged on a side of the carrier facing the test strip. Therefore, light transmitted by the active area of the test strip is directly incident on the photodetector.

The side of the carrier facing the test strip may be a main surface of the carrier. The at least one photodetector may be attached to the carrier by an adhesive layer like glue or solder. By arranging the photodetector on the main surface of the carrier, but not directly on the test strip, no complicated flip-chip technology is required for implementing the photodetector inside the test strip cassette.

In an embodiment, the test strip cassette further comprises a third opening of the housing, electrical contacts of the carrier arranged beyond the third opening outside the housing, and conducting lines on or in the carrier electrically connecting contact areas of the at least one photodetector to the electrical contacts beyond the third opening.

This can mean that the housing defines the third opening and that one end of the carrier comprising the electrical contacts can reach through the third opening such that said end is located outside the housing. The electrical contacts may be arranged at the main surface of the carrier and/or another surface of the carrier, e.g. at the backside of the carrier.

The carrier with the conducting lines can provide electrical power and signals to/from the photodetector. This can mean that the only electrical connections to the photodetector run over the conducting lines on or in the carrier. Since the electrical contacts are located outside the housing, the at least one photodetector can be electrically controlled by an external device, e.g. a monitoring device.

As the test strip is located in an upper part of the test strip cassette the first and the second opening are arranged on an upper side of the housing. The third opening is realized on a lower side of the housing, since the carrier is arranged below the test strip. In an alternative embodiment, the third opening of the housing is on a bottom side of the housing. Thus, contacts to the conducting lines are realized from below.

The conducting lines can also be named traces. The conducting lines might be made out of a metal such as copper, aluminum or silver. If the conducting lines are made out of copper or aluminum they may be etched. In case of conducting lines comprising silver, silver ink may be used. The conducting lines may be designed partially as straight lines and partially as curved lines on the carrier. The conducting lines may run parallel, so that they are isolated from each other. The conducting lines are aligned with the contact areas of the photodetector and the electrical contacts at the end of the carrier outside the housing.

In an embodiment, the conducting lines comprise a power supply line, a reference potential line and at least one bus line. Electrical power can be provided to the photodetector from a power supply using the power supply line and the reference potential line. Data can be transmitted from the photodetector to other circuits of a monitoring device via the at least one bus line.

In an embodiment, the photodetector is implemented as a spectral sensor that is configured to detect light in at least two different wavelength regions, in particular to separately detect light in at least two different wavelength regions. Advantageously, two colors may be generated at one active area; each of the colors can be measured separately by the spectral sensor. Thus, two components or two analytes may be detected at one active area. The spectral sensor may be operable to detect light in more than two, more than four or more than eight different wavelength regions. The different wavelength regions may be in the visible range or in the visible plus infrared range or in the visible plus near-infrared range.

In an embodiment of the test strip cassette, an inside surface of the housing comprises at least one of a step, slot and/or protrusion to receive the test strip and the carrier in predetermined positions in order to provide positional alignment between the second opening, the at least one active area and the at least one photodetector.

The inside surface does not face the environment of the housing, but the test strip and the carrier, which are arranged inside the housing. For example, the inside surface of the housing provides a slot, where the carrier is arranged in. In that way it is ensured that the carrier has a fixed position with respect to the housing. In lateral directions and in the vertical direction the carrier cannot or can only slightly move, so that alignment with the test strip is possible.

The position of the test strip within the housing may be defined by steps and/or protrusions formed by the inside surface of the housing. Accordingly, the test strip has a fixed position with respect to the housing. In each direction the test strip cannot or can only slightly move, so that the test strip is aligned with the carrier.

In an embodiment, the protrusions can also be configured to apply a force to the test strip or to one or more ends of the test strip, respectively. In that way, a tension of the test strip can be realized which may also be beneficial in view of alignment between the at least one active area and the at least one photodetector. This in turn improves the accuracy of evaluating the respective measurement performed by the test strip cassette.

The steps, slot and/or protrusions can also be called alignment structures. In that sense, the spacer structure serves as an additional alignment structure as it ensures the separation between the carrier and the test strip at a pre-defined distance.

In an embodiment a distance between the at least one active area and the at least one photodetector is between 0.3 mm and 5 mm. In another embodiment, the distance between the at least one active area and the at least one photodetector is between 0.5 mm and 3 mm.

The distance between the at least one active area and the at least one photodetector is in the vertical direction. In case that more than one active area and more than one photodetector are present, the distance between each pair of a respective active area and the corresponding photodetector aligned with the respective active area may have the above mentioned dimensions. In that way it is ensured that the distance from the photodetector to the active area is short. This in turn results in a high efficiency and reproducibility for detecting light transmitted or emitted by the at least one active area.

In an embodiment, the test strip comprises at least two active areas. Thus, two components of the sample liquid or two analytes can be detected at the at least two active areas.

In an embodiment, the photodetector comprises at least two pixels which are each aligned with one of the at least two active areas. A pixel can be named photodetector element. A pixel may be realized as photodiode.

In an alternative embodiment, a first photodetector is aligned with one of the at least two active areas and a second photodetector is aligned with another one of the at least two active areas. The photodetectors may be arranged on the same carrier or they may even be arranged on the same chip, e.g. semiconductor chip.

According to a further embodiment, the first opening and the second opening are arranged on an upper side of the housing, wherein the test strip is arranged between the upper side and the carrier. In this embodiment, the first opening and the second opening are arranged on the same side of the housing.

According to an alternative embodiment, the first opening is arranged on an upper side of the housing and the second opening is arranged on an opposite lower side of the housing, wherein the test strip is arranged between the lower side and the carrier. Thus, the first opening and the second opening are arranged on different sides of the housing.

Terms such as “top”, “bottom”, “upper”, “lower”, “front”, “back” etc. do not necessarily refer to orientation in space, but are used in this disclosure for distinguishability with respect to individual features of the embodiments.

The different arrangements can be favorable in terms of manufacturing the housing and assembling the individual components. Furthermore, depending on the location of a light source relative to the test strip cassette, the second opening providing the optical path may be located on different sides of the cassette. The second opening forms an access to the potentially sensitive active area and photodetector. By placing the second opening on the upper or lower side of the housing, respectively, these components can be better protected from environmental influences like touching or the like.

According to a further embodiment, the at least one active area is arranged on a side of the test strip that faces away from the carrier. This can mean that the active area faces the second opening of the housing, such that the active area is visible through the second opening. Advantageously, a test result can also be determined by visual inspection, additionally to evaluation of the photodetector signal.

According to an alternative embodiment, the at least one active area is arranged on a side of the test strip that faces the carrier. In this way, the performance of a transmission measurement is improved because the active area is closer to the photodetector and a color change of the active area is not distorted by the substrate of the test strip.

In those embodiments, the detection/measurement is not realized as reflected ray measurements, but will be a refracted/transmitted/absorbed measurement. The light source may be placed on one side of the test strip and the detection is done on the other side of the test strip by the photodetectors. Thus, the light is refracted, transmitted or absorbed by the test strip. The test strip may be placed in the test strip cassette such that the at least one active area on one side of the test strip faces the photodetector while the test strip is illuminated from an opposite side of the test strip. Alternatively, the test strip may be placed in the test strip cassette such that the at least one active area on one side of the test strip faces the light source, while the opposite side of the test strip faces the photodetector.

According to a further embodiment, the test strip cassette further comprises a light source that is arranged on the carrier. The light source is configured to emit light towards the at least one active area, and the at least one photodetector is configured to detect light reflected from the at least one active area.

The light source can be arranged in the vicinity of the photodetector, such that it is aligned with the active area of the test strip. The light source and the photodetector can be approximately in the same plane. The light source can be separated from the photodetector by a light barrier, such that light emitted by the light source does not reach the photodetector directly. Instead, emitted light is reflected from the active area back to the photodetector. Thus, a reflectance measurement can be provided.

According to a further embodiment, the second opening defined by the housing tapers towards the at least one active area of the test strip. This can mean that a diameter of the second opening becomes smaller towards the at least one active area. For example, the second opening describes a conical or parabolic shape. In other words, a sidewall of the second opening is inclined with respect to the vertical direction. Light rays from a light source at an input side of the second opening (outside the test strip cassette) can be coupled into the second opening under a wide angle. Further, the light rays can be reflected at the sidewall of the second opening formed by the housing once or multiple times. Since the second opening tapers towards the active area (at an output side of the second opening) the light rays are effectively collimated, so that an intensity of light at the active area is increased.

In case that the test strip comprises a plurality of active areas, each active area may be provided with a separate second opening. Thus, the test strip cassette may comprise a plurality of second openings, wherein each second opening is assigned to one active area. Each of the second openings may taper towards the respective active area assigned, as described above. Alternatively, at least some of the active areas share a common second opening.

The second opening can also be called aperture. In other words, the draft angle of the aperture is changed to collimate and focus the light towards the test strip. Thus, a light collection effectiveness and light collimation can be increased. Advantageously, a refractive lens is not required to increase light collection effectiveness and light collimation. The housing may be a molded compound. Thus, a low cost and lens free arrangement is provided to improve light collection effectiveness and sensitivity. This also allows the tolerance of the distance between the active area and the photodetector to be more relaxed.

In a further embodiment, the sidewall of the second opening defined by the housing is coated with a reflective layer. The reflective layer be arranged exclusively at the sidewall of the second opening, i.e. at an inner surface of the second opening. Thus, a reflective surface is provided at the sidewall of the second opening. The reflective layer may be a lacquer, by way of example. By means of the reflective layer light rays are better reflected at the sidewall and light collimation is increased.

Furthermore, a monitoring device is provided that comprises the test strip cassette as discussed above. This means that all features disclosed for the test strip cassette are also disclosed for and applicable to the monitoring device and vice-versa.

In an embodiment, the monitoring device comprises the test strip cassette, a light source and a control circuit connected to the photodetector and to the light source.

The test strip is located between the light source and the carrier comprising the photodetector. Thus, transmittance measurements are enabled. Alternatively, the light source is arranged on the carrier inside the test strip cassette. Here, the light source can be seen as part of the test strip cassette and the test strip cassette enables reflectance measurements as described above. The monitoring device may be named reader.

In an embodiment, the monitoring device is configured such that the test strip cassette is selectively insertable into and removable from the monitoring device. Thus, the test strip cassette is used once, namely for a single test. The monitoring device is designed to be used several times, e.g. with different test strips for detecting different analytes or with test strips for detecting the same analyte.

Alternatively, the test strip cassette can be used more than once after replacement of the test strip. For example, the test strip cassette could be designed such it can be opened and closed. By doing so, the used test strip can be removed, and an unused test strip can be inserted into the test strip cassette. Advantageously, the housing as well as the carrier with the at least one photodetector are reusable.

Alternatively, the housing including the test strip is disposable. However, the carrier including the at least one photodetector can be reused. For example, the test strip cassette can be opened, so that the carrier can be removed and inserted into a fresh housing including an unused test strip. In another embodiment the carrier can be slid out of the housing via the third opening. In the same way it can be slid into a fresh housing including an unused test strip. Reusing the housing and/or the carrier is beneficial from an environmental point of view.

In an embodiment, the control circuit is configured to detect whether the test strip cassette is inserted or not and to provide an enable signal when the test strip cassette is inserted. By generating the enable signal, the monitoring device may be able to detect the correct insertion of the test strip cassette into the monitoring device or/and may be able to detect whether the correct test strip cassette is inserted.

In an embodiment, the monitoring device is configured to perform a lateral flow test, abbreviated LFT, or a lateral flow immunochromatographic assay.

The object is further solved by a method for producing a test strip cassette. All features disclosed for the test strip cassette are also disclosed and applicable to the method for fabricating the test strip cassette and vice-versa.

In an embodiment, the method for fabricating a test strip cassette comprises providing a carrier comprising at least one photodetector.

The carrier can be a printed circuit board (PCB), on which the photodetector is mounted. For example, the photodetector can be attached to the carrier by means of an adhesive layer like glue or solder. The carrier can comprise conducting lines for electrically connecting the photodetector. In order to establish an electrical connection the photodetector may be wire-bonded to the carrier. This means that a wire bond connects the conducting lines of the carrier to contact areas of the photodetector.

The method further comprises providing a test strip comprising a sample pad and at least one active area.

The test strip may further comprise a porous material, in particular nitrocellulose, which is operable to transfer the sample liquid from the sample pad to the at least one active area. The active area of the porous material may be provided with a chemical substance, typically a chemical compound, which reacts with a component of the sample liquid. The test strip may further comprise a conjugate pad and an absorbing pads such that the porous material including the sample pad, the conjugate pad and the absorbing pad are arranged on a substrate. The substrate may be fabricated as a backing card, for example as a plastic adhesive backing card.

The method further comprises providing a housing defining a first opening being configured to receive a sample liquid, defining a second opening configured to provide an optical path into the housing, and a spacer structure. The housing may comprise a plastic material, which is formed by a molding technique, e.g. injection molding.

Moreover, the method comprises assembling the housing, the test strip and the carrier such that the housing encloses the carrier and the test strip. In doing so, the test strip is spaced from the carrier by the spacer structure and arranged between the second opening and the carrier. Additionally, the at least one photodetector, the at least one active area and the second opening are aligned to each other, and the sample pad is aligned with the first opening of the housing.

Since both the carrier and the test strip are located inside the housing, a distance from the photodetector to the active area is short. This results in a high efficiency and reproducibility for detecting light transmitted or emitted by the at least one active area. The at least one photodetector is not directly attached to the test strip, but arranged on a separate carrier. In that way the fabrication process is facilitated as no complicated flip-chip techniques are required. Thus, the fabrication process can be realized very cost-effective.

In a variant of the method, the method further comprises providing a third opening of the housing. The third opening can be located in at a lower part of the housing, where the carrier is present. A portion of the carrier may extend through the third opening. Electrical contacts are formed on the carrier beyond the third opening outside the housing. Conducting lines are formed on or in the carrier, wherein the conducting lines electrically connect contact areas of the at least one photodetector to the electrical contacts beyond the third opening.

By doing so, the test strip cassette can be electrically operated by an external device, e.g. a monitoring device. In particular, the at least one photodetector on the carrier can be powered up and electrical signals can be received via the electrical contacts and the conducting lines.

Further embodiments of the method become apparent to the skilled reader from the embodiments of the test strip cassette described above. For example, the method for fabricating a test strip cassette may be implemented by the test strip cassette and the monitoring device according to one of the embodiments defined above.

The test strip cassette with embedded spectral sensor is configured for an optical assay reading device. The test strip cassette is implemented as a smart test strip cassette, as it includes an embedded spectral sensor. The test strip cassette is configured for a lateral flow test system, abbreviated as LFT system. The LFT system performs refracted and/or transmitted and/or absorbance measurements.

The disclosure applies to the field of lateral-flow-test for point-of-care (abbreviated PoC). The test strip in the test strip cassette reacts to a certain substance that is present in the liquid under test, and color of the porous active area, realized e.g. by depositing conjugated antibodies on the nitrocellulose membrane, changes accordingly when analytes bind to conjugated antibodies. The liquid under test may be named sample, sample liquid or analyte. Alternatively, the substance to be detected is called analyte. The substance to be detected may be a chemical element or a chemical compound.

An example of an application is a home pregnancy test. The test is e.g. able to detect human chorionic gonadotropin (HCG) in urine of a pregnant women. The test assay utilizes the capillary action of porous paper and the ability to bind marker proteins to the cellulose. Usually a two line pattern is used. The first line generates a yes/no signal (pregnant or not). The second line indicates if the test is successful or not. Point-of-care tests (PoC tests) have the ability to test a patient at the point where the care is necessary. This allows a faster diagnosis, hence a faster treatment.

Other important applications are tests for identifying diseases. Especially in the case of an outbreak of a global pandemic, such as Covid19, it can be important to provide tests that can quickly determine whether the tested person is infected or not. Moreover, such tests can be performed by anyone at home, thus saving the resources of public laboratories. The test strip cassette can be manufactured inexpensively and effectively, ensuring rapid and worldwide distribution.

Normally, the LFT is read (analyzed) by the human eye, and therefore the ability is lacking to measure variation in concentrations accurately. Lateral flow tests also known as lateral flow immunochromatographic assays are effective devices intended to detect the presence (or absence) of a target analyte in a sample (matrix) without the need for specialized and costly equipment, though many lab based applications exist that are supported by reading equipment. Typically, these tests are used for medical diagnostics either for home testing, point of care testing or laboratory use.

The test strip cassette described in the present disclosure aims at an improvement of system performance, e.g. a further increase of the reading accuracy and better quantitative analysis by an improved location of the spectral sensor with respect to the membrane area (active area) that needs to be analyzed. Moreover, the LFT PoC reading device may be improved, e.g. by a cost reduction on the reader side.

Moreover, the present disclosure aims at a simplification of the manufacturing process and final implementation: the spectral sensor is not placed directly on the test strip, for example by flip-chip bonding the sensor on the backside of the test strip, but on a separate carrier in the test strip cassette below the test strip. Therefore, no complicated and expensive flip-chip assembly is necessary.

BRIEF DESCRIPTION OF THE DRAWINGS

The following description of figures may further illustrate and explain aspects of the test strip cassette, the monitoring device and the method for fabricating a test strip cassette. Components and parts of the test strip cassette that are functionally identical or have an identical effect are denoted by identical reference symbols. Identical or effectively identical components and parts might be described only with respect to the figures where they occur first. Their description is not necessarily repeated in successive figures.

DETAILED DESCRIPTION

Figure 1A:
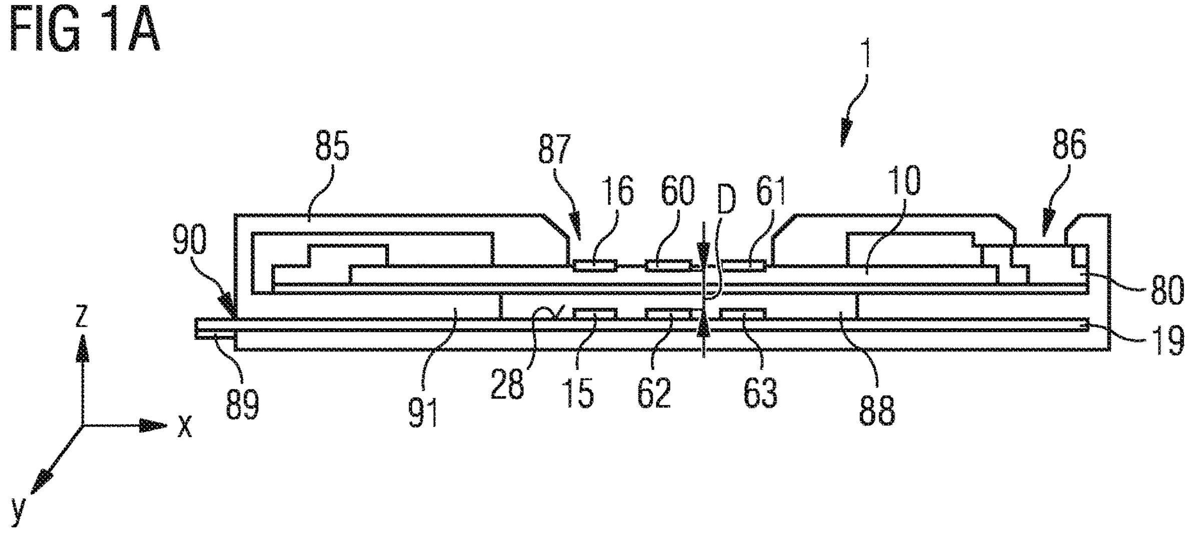
FIGS. 1A and 1B show examples of a test strip cassette.

FIG. 1A shows an example of the test strip cassette 1 in a cross-sectional view. The test strip cassette 1 comprises a housing 85, a test strip 10 and a carrier 19. The housing 85 may be fabricated as a plastic holder. The housing 85 defines a first opening 86 being configured to receive a sample liquid. This means that the sample liquid can be inserted via the first opening 86 of the housing 85 onto the test strip 10. The first opening 86 of the housing 85 may also be called sample port.

The housing 85 further defines a second opening 87 configured to provide an optical path into the housing 85. The second opening 87 of the housing 85 may also be called test opening. Light emitted by a light source (not shown) can be transmitted via the second opening 87 into the housing, where the test strip 10 the carrier 19 are present. The housing 85 may comprise more than one test opening. In an alternative embodiment, not shown, the housing 85 defines an additional test opening. Light emitted by the light source can be transmitted through the second opening 87 and through the additional test opening in order to reach into the housing Thus, the second opening 87 and optional additional test openings provide an optical path into the housing.

The housing 85 further comprises a spacer structure 91. The spacer structure 91 may be formed by a portion of the housing at its inner side. The spacer structure 91 may be provided to separate the test strip 10 from the carrier 19. This means that the spacer structure 91 is arranged between the test strip 10 and the carrier 19.

The carrier 19 comprises at least one photodetector 15. This can mean that the at least one photodetector 15 is arranged on or above a main surface 28 of the carrier 19. The at least one photodetector 15 is aligned with the second opening 87 of the housing 85. This can mean that in a vertical direction z, which runs perpendicular to a main plane of extension of the carrier 19, the at least one photodetector 15 is arranged under the second opening 87 of the housing 85. In lateral directions x, y, which run parallel to the main plane of extension of the carrier 19, the region of the at least one photodetector 15 overlaps the region of the second opening 87.

In the example according to FIG. 1A the carrier 19 comprises three photodetectors 15, 62, 63 which each are aligned with the second opening 87 of the housing 85. Alternatively, the additional photodetectors 62, 63 may be aligned with respective additional test openings.

The test strip 10 comprises a sample pad 80 which is aligned with the first opening 86 of the housing 85. This can mean that in the vertical direction z, the sample pad 80 is arranged under the first opening 86 of the housing 85. In the lateral directions x, y the region of the sample pad overlaps the region of the first opening 86. Thus, the sample liquid can be inserted via the first opening 86 of the housing 85 onto the sample pad 80 of the test strip 10.

The test strip 10 further comprises at least one active area 16 aligned with the second opening 87 and the at least one photodetector 15. This can mean that in the vertical direction z, the at least one active area 16 is arranged between the second opening 87 of the housing 85 and the at least one photodetector 15. In the lateral directions x, y the region of the at least one active area 16 overlaps the region of the second opening 87 and of the at least one photodetector 15. Thus, light emitted by a light source can be transmitted through the second opening 87 and the active area 16 of the test strip 10. The at least one photodetector 15 under the at least one active area 16 can detect the transmitted light. Therefore, the at least one photodetector is arranged on a side of the carrier 19 facing the test strip 10. This side may be the main surface 28 of the carrier 19.

In the example shown in FIG. 1A the test strip 10 comprises two additional active areas 60, 61 arranged in lateral directions next to the active area 15. The number of active areas 15, 60, 61 may match the number of photodetectors 15, 62, 63. Alternatively, the number of active areas 15, 60, 61 may match the number of pixels of the at least one photodetector 15. In that way, each of the photodetectors 15, 62, 63 or the pixels, respectively, can be aligned with one of the active areas 16, 60, 61, as shown in FIG. 1A. The second opening 87 of the housing 85 has a form such that light emitted by the light source reaches the number of active areas 16, 60, 61.

In the example of FIG. 1A, the photodetector 15 is arranged under and aligned with the active area 16 such that the photodetector 15 receives light from the active area 16. Correspondingly, the additional photodetector 62 is arranged under and aligned with the additional active area 60. The second additional photodetector 63 is arranged under and aligned with the second additional active area 61. Thus, a respective photodetector 15, 62, 63 is arranged under and aligned with one of the active areas 16, 60, 61. The additional and the second additional photodetector 62, 63 may be implemented as spectral sensors.

Figure 3A:
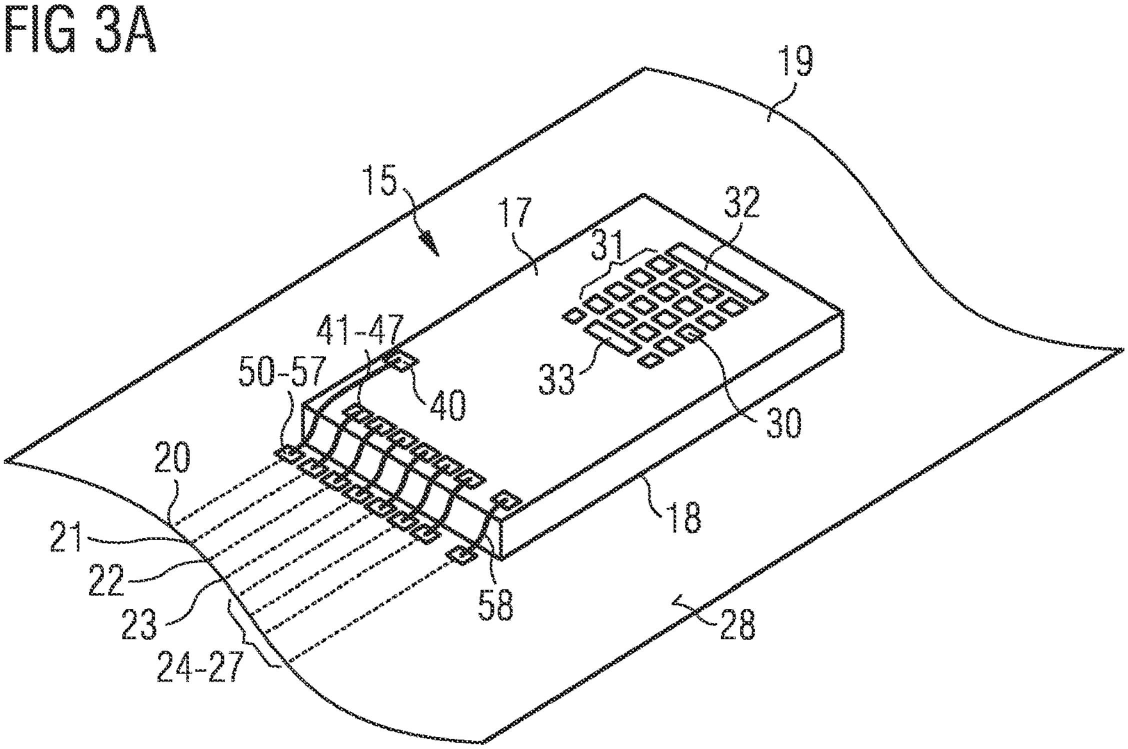
FIGS. 3A and 3B show examples of details of a photodetector.
Figure 3B:
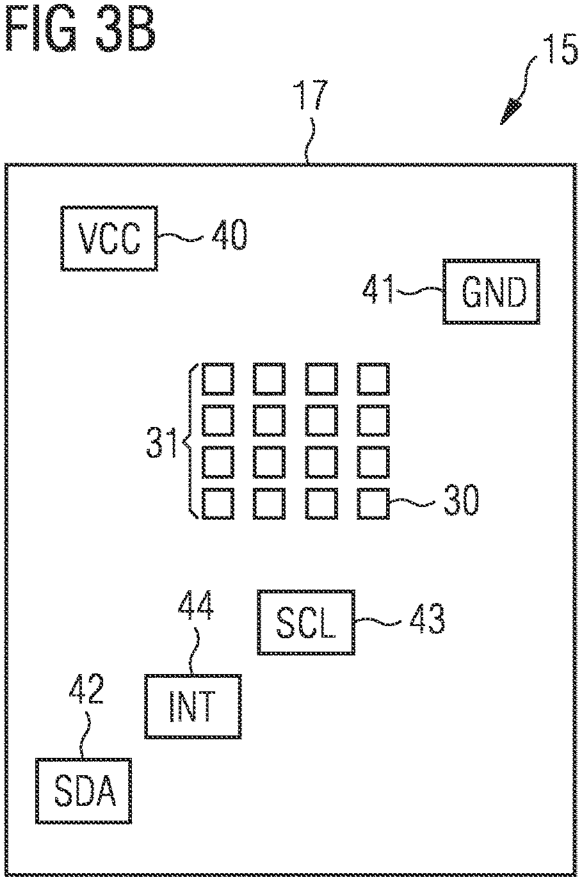

Each of the photodetectors 15, 62, 63 may comprise a photodetector array 31 (as shown in FIGS. 3A and 3B). Thus, each of the photodetectors 15, 62, 63 may be configured to detect light emitted by the active areas 16, 60, 61 at different ranges of the light spectrum. The photodetectors 15, 62, 63 may be realized using separate integrated circuits or chips or dies. The carrier may be fabricated with multiple spectral sensors.

The detection/measurement is not realized as reflected ray measurements, but will be a refracted/transmitted/absorbed measurement. The light source will be placed on one side of the test strip 10 and the detection is done on the other side of the test strip 10 by the photodetectors 15, 62, 63. Thus, the light is refracted, transmitted or absorbed by the test strip 10.

The housing 85, the test strip 10 and the carrier 19 are arranged such that the housing 85 encloses the carrier 19 and the test strip 10. The test strip 10 is spaced from the carrier 19 by the spacer structure 91 and arranged between the second opening 87 and the carrier 19.

A cavity 88 is formed between the carrier 19 and the test strip 10 at a location where the photodetectors 15, 62, 63 are present. In lateral directions x, y the cavity 88 is delimited by the housing 85, in particular by the spacer structure 91. In the vertical direction z the cavity 88 is delimited by the carrier 19 on a bottom side and by the test strip 10 on an upper side. The cavity 88 can be filled with air or a gas.

The separation between the test strip 10 and the carrier 19 is defined by the vertical extent of the spacer structure 91. Thus, a distance D between the at least one active area 16 and the at least one photodetector 15 is defined by the vertical extent of the spacer structure 91. For example, the distance D between the at least one active area 16 and the at least one photodetector 15 is between 0.5 mm and 15 mm. Alternatively, the distance D between the at least one active area 16 and the at least one photodetector 15 is between 1 mm and 10 mm.

The carrier 19 may comprise conducting lines 20 to 27 (shown in FIG. 3A) which can be electrically contacted with contact areas 40 to 47 (shown in FIG. 3A) of the at least one photodetector 15. Moreover, the conducting lines 20 to 27 may be electrically contacted with electrical contacts 89 of the carrier 19. In particular, the carrier 19 may comprise a power supply line 20, a reference potential line 21 and at least one bus line 22. The carrier 19 may also comprise a further bus line 23.

For example, the electrical contacts 89 can be arranged at an end of the carrier 19. Thus, the housing 85 may comprise an third opening 90 such that a part of the carrier 19 is located outside of the housing 85. The electrical contacts 89 of the carrier may be arranged beyond the third opening 90 outside the housing 85. The conducting lines 20 to 27 may be arranged on or in the carrier 19 and electrically connect the contact areas 40 to 47 of the at least one photodetector 15 to the electrical contacts 89 beyond the third opening 90.

In an alternative embodiment, not shown, the opening 90 of the housing 85 is on a bottom side of the housing 85. Thus, contacts to the conducting lines 20 to 27 are realized from below. The first opening 86 and the second opening 87 are located on an upper side of the housing 85, while the third opening 90 is realized on a lower side of the housing 85.

Figure 1B:
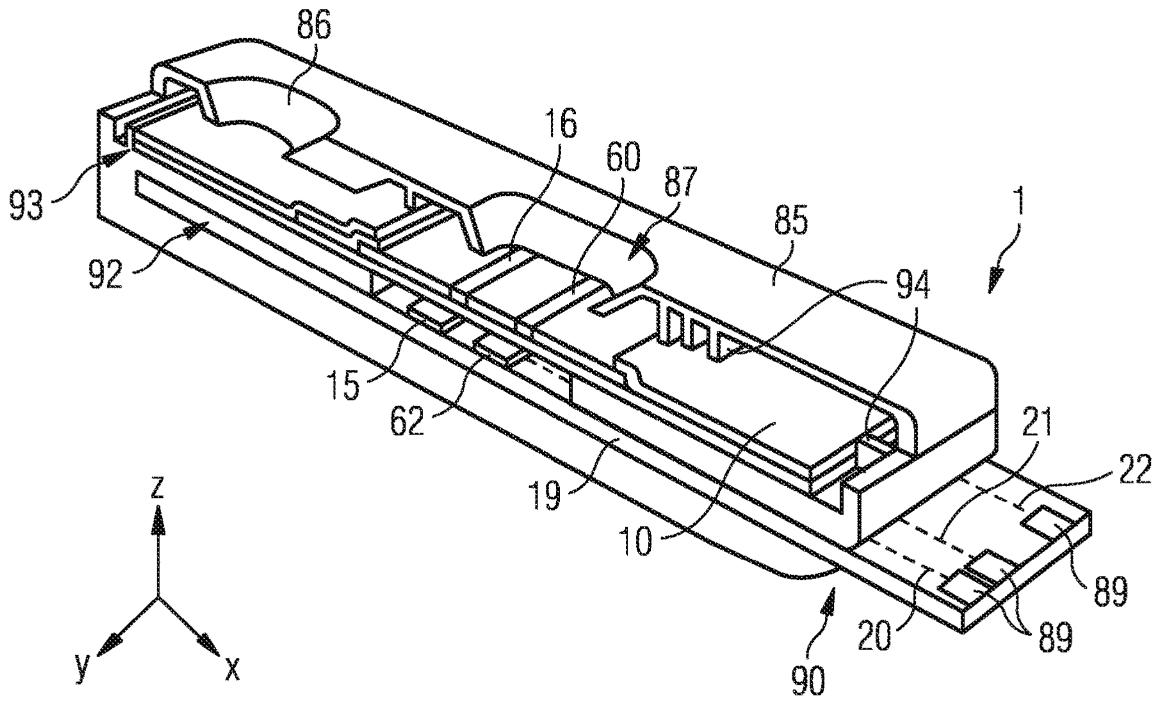

FIG. 1B shows an example of the test strip cassette 1 in a perspective cut-view through the test strip cassette 1. In this example, the test strip 10 comprises two active areas 16, 60, which are aligned with two respective photodetectors 15, 62 on the carrier 19.

Several conducting lines 20 to 22 are arranged in or on the carrier 19. For example, a first conducting line 20 may comprise a power supply line. A second conducting line 21 may comprise a reference potential line and at least a third conducting line 22 may comprise a bus line. The conducting lines 20 to 22 electrically connect contact areas (not shown) of the photodetectors 15, 62 with electrical contacts 89 on the carrier 19, which are arranged outside the housing 85.

It can be seen in FIG. 1B that the housing 85 of the test strip cassette 1 comprises an inside surface, which comprises several slots 92, steps 93 and protrusions 94. The slots 92, steps 93 and protrusions 94 are provided to receive the test strip 10 and the carrier 19 in predetermined positions and to provide positional alignment between the second opening 87, the active areas 16, 60 and the photodetectors 15, 62. For example, the inside surface of the housing 85 provides a slot 92, where the carrier 19 is arranged in. In that way it is ensured that the carrier 19 has a fixed position with respect to the housing 85. In lateral directions x, y and in the vertical directions z the carrier cannot or can only slightly move, so that alignment with the test strip 10 is possible.

The position of the test strip 10 within the housing 85 is defined by steps 93 and protrusions 94 formed by the inside surface of the housing 85. Accordingly, the test strip 10 has a fixed position with respect to the housing 85. In each direction x, y, z the test strip 10 cannot or can only slightly move, so that the test strip 10 is aligned with the carrier 19. The protrusions 94 can also be configured to apply a force to one or more ends of the test strip 10. In that way, a tension of the test strip 10 can be realized which may also be beneficial in view of alignment between the active areas 16, 60 and the photodetectors 15, 62. This in turn improves the accuracy of evaluating the respective measurement.

Figure 2A:
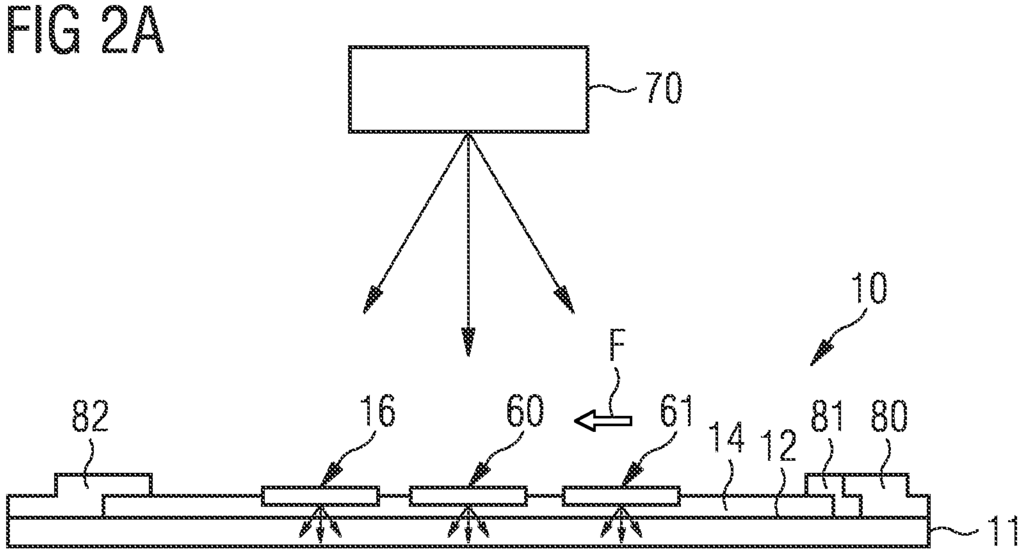
FIGS. 2A and 2B show examples of details of a test strip.

FIG. 2A shows an example of the test strip 10 in a cross-sectional view. The test strip 10 is configured with multiple active areas 16, 60, 61. Moreover, the test strip comprises a porous material 14, in particular nitrocellulose, in which the active areas 16, 60, 61 are embedded. The porous material 14 is operable to transfer the sample liquid from the sample pad 80 to the active areas 16, 60, 61. The active areas 16, 61 are provided with a chemical substance which reacts with a component of the sample liquid.

The porous material 14 is translucent or transparent. The porous material 14 has the form of a layer, membrane, film or sheet. The porous material 14 may be made of nitrocellulose. The porous material 14 may be fabricated as a nitrocellulose membrane. The porous material 14 is configured such that a liquid can laterally flow in the porous material 14. The direction of flow F is indicated by an arrow. The flow F of the liquid is performed using a capillary effect in the porous material 14. The liquid may be named sample liquid.

The number of active areas 16, 60, 61 may be larger than 1, larger than 2 or larger than 3. The active areas 16, 60, 61 may be rectangular, quadratic, circular or elliptical. The active areas 16, 60, 61 may reach e.g. from one border of the porous material 14 to the other border of the porous material 14. In the cross-section shown in FIG. 2A, the flow F of the sample liquid in the porous material 14 is from the right side to the left side.

The test strip 10 comprises the sample pad 80, a conjugate pad 81 and an absorbent pad 82. The sample pad 80, the conjugate pad 81 and the absorbent pad 82 are arranged at main side 12 of a substrate 11 and enclose the side surfaces of the porous material 14. The pads 80 to 82 will be further explained with respect to FIG. 2B.

FIG. 2A further shows a light source 70. The light source emits light as indicated by arrows. The light source 70 may be implemented as a spectral source. The light is emitted in a broad angle by the light source 70 and reaches the active area 16. Light of the light source 70 also reaches the additional and the further active area 60, 61. Thus, light emitted by the light source 70 reaches each of the active areas 16, 60, 61. The light source 70 may be fabricated as a broad band spectral source or black body spectral source, abbreviated BB spectral source. The light source 70 may emit light e.g. in the range from 350 nm to 1050 nm or from 350 nm to 750 nm. Alternatively, the light source 70 may be realized as a narrow band source (having e.g. a very limited bandwidth, such as for example a specific light color source or a pure near infrared source).

The substrate 11 is or may be translucent or transparent. Additionally, the porous material 14 is or may be translucent or transparent. Thus, light from the active area 16—as indicated by arrows—can reach the at least one photodetector 15 (not shown in this Figure) below the active area 16. The optical characteristic of the active area 16 depends on the optical characteristics of the porous material 14, of the chemical substances fixed at the porous material 14 in the active area 16 and of the concentration of an analyte in the sample liquid. For example, the light source 70 emits light in a broad spectrum. The active area 16 transmits light only in a small spectrum such as, for example, red light. The amount of light emitted or transmitted by the active area 16 depends on the concentration of the analyte in the sample liquid. The value of the light may rise with rising concentration of the analyte. The light transmitted by the active area 16 is detected by the photodetector 15.

The additional photodetector 62 (not shown) and the second additional photodetector 63 (not shown) can detect light originating from the additional and the second additional active area 60, 61. The different active areas 16, 60, 61 may have different substances for reaction with the analytes of the liquid. Thus, the optical characteristics of the respective active areas 16, 60, 61 may be different and are detected by the photodetectors 15, 62, 63 (not shown).

In an alternative embodiment, not shown, light is emitted by the light source 70 at one wavelength and is absorbed by a substance in the active area 16, wherein the substance in the active area 16 emit light at another wavelength. Thus, the light is emitted by the active area 16 using fluorescence or phosphorescence. In this case, the light source 70 emits light in a small band. The amount of light emitted by the active area 16 depends on the amount of analyte that reacts with the substance fixed at the active area 16. For example, the light source 70 is realized as a laser, a light-emitting diode or a vertical-cavity surface-emitting laser, abbreviated as VCSEL.

In an alternative embodiment, not shown, the light source 70 is omitted. Thus, a monitoring device is free from a light source. A reaction of a chemical substance of the active area 16 with an analyte in the liquid results in an emission of light. Thus, light is emitted by the active area 16 using chemo-luminescence.

Figure 2B:
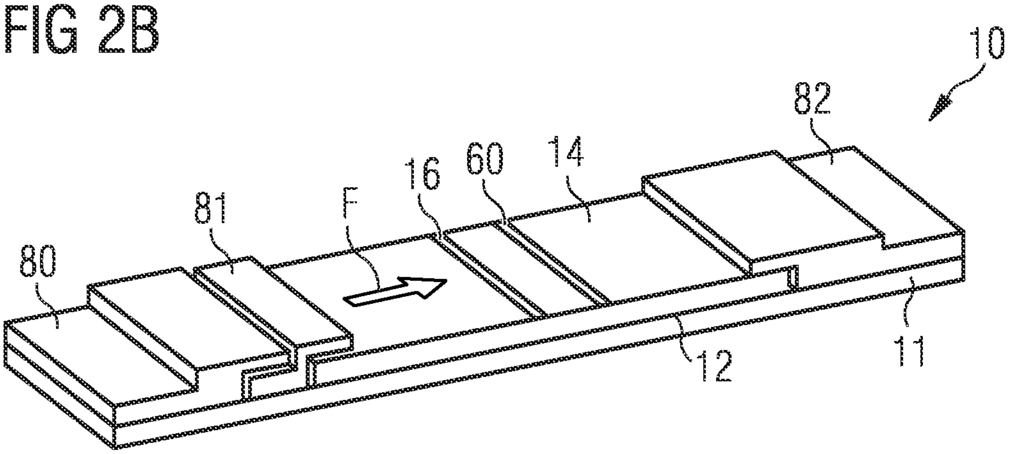

FIG. 2B shows an example of the test strip 10 in a perspective view. The porous material 14 comprises the active area 16 and the additional active area 60. The active area 16 may be realized as a test active area, e.g. as a test line. The additional active area 60 may be implemented as a control active area, e.g. as a control line. Thus, a change of the optical characteristics at the additional active area 60 indicates that the test is performed correctly, for example that a sufficient amount of liquid has been provided to the test strip 10. A result of the test is detected by measurement of the optical characteristics at the active area 16. The substrate 11 may be fabricated as a backing card, for example as a plastic adhesive backing card.

Additionally, the test strip 10 comprises the sample pad 80. The sample pad 80 is configured to receive the sample liquid e.g. from a user or a liquid dispenser. The sample pad 80 is located on the main side 12 of the substrate 11. Moreover, the test strip 10 comprises the conjugate pad 81. The conjugate pad 81 is realized for providing a substance to the sample liquid. The conjugate pad 81 is located on the main side 12 of the substrate 11. The conjugate pad 81 is arranged between the sample pad 80 and the porous material 14. An overlap of the sample pad 80 is on the conjugate pad 81. Thus, an effective transfer of liquid from the sample pad 80 to the conjugate pad 81 is achieved using the overlap. An overlap of the conjugate pad 81 is on the porous material 14. An efficient transfer of liquid from the conjugate pad 81 to the porous layer 14 is achieved by the area of the overlap. The sample pad 80 and the conjugate pad 81 are located at a first end of the test strip.

The test strip 10 comprises the absorbent pad 82 being located on the main side 12 of the substrate 11. The absorbent pad 82 is arranged at a second end of the test strip 10. The absorbent pad 82 is in contact with the porous material 14. The absorbent pad 82 has an overlap with the porous material 14. Thus, a transfer of liquid is achieved from the porous material 14 to the absorbent pad 82 by the overlap. As indicated by the arrow F, the liquid flows from the sample pad 80 via the conjugate pad 81 and the porous material 14 to the absorbent pad 82. The sample liquid inserted on the sample pad 80 only partially reaches the absorbent pad 82. The photodetectors 15, 62 (not shown) detect the change of the optical characteristics at the active areas 16, 60.

In general, the test strip 10 is built in a stacked structure as following: The test strip 10 includes the substrate 11. The material of the substrate 11 is made e.g. of polystyrene, vinyl or polyester. In general, the substrate 11 is clear (that means transparent) or can be opaque too. An opaque substrate 11 may comprise a transparent or translucent window at the active area 16. The window may be realized by inserting a transparent or translucent material or by reducing the thickness of the substrate 11. The substrate 11 is used to hold the porous material 14, which may also be called membrane 14. Then, on one side or end of the membrane 14, a conjugate pad 81 is placed on the membrane 14, followed by the sample pad 80. On the other side or end of the membrane 14, the absorbent pad 82 is placed. The two lines, control line and test line 16, 60, show respectively the validity of the test and the test result.

FIG. 3A shows an example of the photodetector 15 that is arranged on the carrier 19 in the test strip cassette 1 shown in FIGS. 1A and 1B. In FIG. 3A, a perspective view on the photodetector 15 is illustrated. The photodetector 15 comprises at least one pixel 30 on a first side 17 of the photodetector 15. The pixel 30 may be called photodetector element. The photodetector 15 may comprise a photodetector array 31 of pixels 30 on the first side 17 of the photodetector 15. The photodetector array 31 may be an n·m array of pixels. In the example shown in FIG. 3A, the photodetector array 31 is a 4·4 array. The pixels 30 of the photodetector array 31 may be sensitive for different regions of light. The pixels 30 may be realized as photodiodes. Thus, the photodetector array 31 realizes a spectral sensor. Additionally, the photodetector 15 may comprise an additional pixel 32 and a further pixel 33 that are larger than a pixel of the photodetector array 31 and are located adjacent to the photodetector array 31.

Moreover, the photodetector 15 comprises contact areas 40 to 47 on the first side 17 of the photodetector 15. The contact areas 40 to 47 are arranged at a border or two borders of the photodetector 15. The contact areas 40 to 47 have a distance to the photodetector array 31. The contact areas 40 to 47 can be realized as bond pads or chip bumps.

A second side 18 of the photodetector 15, which is opposite to the first side 17, is attached to the main surface 28 of the carrier 19. The carrier 19 may be realized as printed circuit board (PCB). The photodetector 15 can be attached to the carrier 19 by means of an adhesive or by soldering. The photodetector 15 comprises multiple bonding wires 58 which are used to electrically connect the photodetector 15 with respective connection points 50 to 57 provided on the carrier 19 next to the photodetector 15. Conducting lines 20 to 27 arranged on or in the carrier 19 reach to the connecting points 50 to 57, so that they are electrically connected to the photodetector 15. The conducting lines 20 to 27 are electrically connected to electrical contacts 89 (not shown in FIG. 3*a*, but in FIGS. 1A and 1B) at one side of the carrier 19.

The conducting lines 20 to 27 can also be named "traces". The conducting lines 20 to 27 are made out of a metal such as copper, aluminum or silver (e.g. fabricated as printed silver ink). The conducting lines 20 to 27 made out of copper or aluminum may be etched. The conducting lines 20 to 27 may be designed partially as straight lines and partially as curved lines. The conducting lines 20 to 27 may run parallel. The conducting lines 20 to 27 are aligned with the contact areas 40 to 47 of the photodetector 15 and electrical contacts 89 at the end of the carrier 19. The conducting lines 20 to 27 may be e.g. rectangular. For example, the first conducting line 20 may be realized as a power supply line. The second conducting line 21 may be implemented as a reference potential line. The third line 22 may be designed as a bus line. The fourth line 23 may be designed as a further bus line. Further conducting lines 24 to 27 may also be realized as bus lines. Thus, the conducting lines 20 to 27 comprise at least one bus line 22 to 27. The bus lines 22 to 27 may be realized as inter-integrated circuit bus lines, abbreviated $I^2C$ lines. In that way it is possible to receive electrical signals from the photodetector 15.

The number of conducting lines 20 to 27, contact areas 40 to 47 and connecting points 50 to 57 shown in FIG. 3A is merely an example. It is also possible that fewer conducting lines 20 to 27, contact areas 40 to 47 and/or connecting points 50 to 57 are present on the carrier 19 and on the photodetector 15, respectively. In particular, the carrier 19 can only comprise the power supply line 20, the reference potential line 21 and the two bus line 22, 23 electrically connecting the photodetector 15 to respective contact areas 89 of the carrier 19.

In an alternative embodiment, not shown, the second side 18 of the photodetector 15 is arranged on the main surface 28 of the carrier 19 by means of an adhesive layer. Electrically conductive vias may be used to electrically connect the first side 17 of the photodetector 15 with the second side 18 of the photodetector 15. The electrically conductive vias may be realized as through-substrate vias (TSV). Solder bumps are provided at the second side 18 of the photodetector 15 in order to electrically connect the photodetector 15 with connection points 50 to 57 on the carrier 19. In this case, no wire bonding is required.

In an alternative embodiment, not shown, the photodetector 15 as well as the additional photodetectors 62, 63 are realized on one die or chip. The photodetectors 15, 62, 63 may be implemented as pixels 30 or as photodetector arrays 31 on one die or chip. The photodetector 15 may be fabricated as a spectral sensor integrated circuit.

FIG. 3B shows another example of the photodetector 15 that is a further development of the photodetector 15 shown in FIG. 3A. The photodetector array 31 is in the center or nearly in the center of the photodetector 15. A first contact area 40 is realized as a power supply contact area for receiving a supply voltage VCC. A second contact area 41 is implemented as reference potential contact area for receiving a reference potential GND. At least one contact area 42 is designed as a bus contact area. For example, a third and a fourth contact area 42, 43 are implemented as bus contact areas, for example for an inter-integrated circuit bus, abbreviated $I^2C$ bus. For example the third and the fourth contact area 42, 43 receive signals or provides signals of the $I^2C$ bus such as a data signal SDA and a clock signal SCL. The fifth contact area 44 may be designed for a bus or for another purpose and receives a signal INT.

Figure 4:
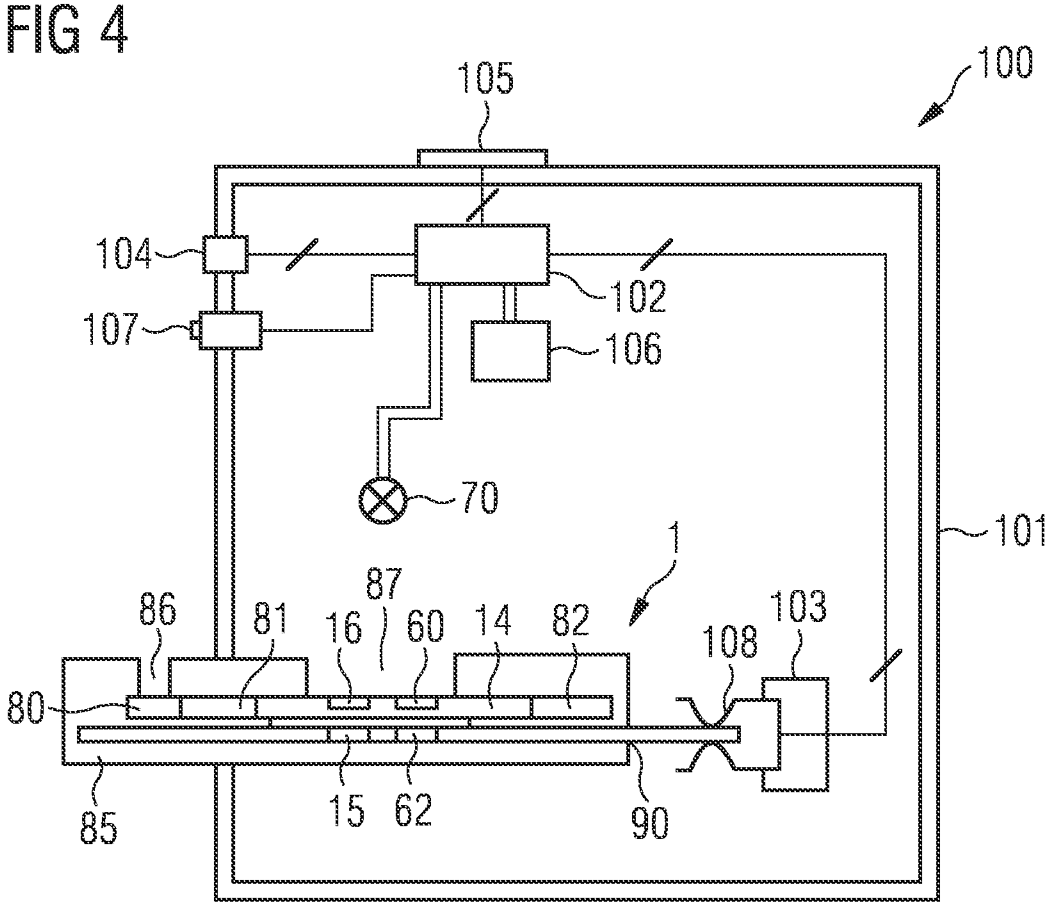
FIG. 4 shows an example of a test strip cassette and a monitoring device.

FIG. 4 shows an example of a monitoring device 100 that comprises the light source 70. The test strip cassette 1 as elucidated above can be inserted into the monitoring device 100 and can be removed again. The monitoring device 100 may be named reader or PoC reader. The monitoring device 100 includes a device housing 101. The light source 70 and part of the test strip cassette 1 are located in the device housing 101. In FIG. 4, the monitoring device 100 is only drawn schematically and as an example.

The monitoring device 100 may comprise a socket 103 having pins or spring contacts 108. The pins or spring contacts 108 of the socket 103 contact the electrical conducts 89 of the carrier 19 outside the housing 85. The monitoring device 100 may comprise guiding parts (not shown) to guide the test strip cassette 1 e.g. into the socket 103. The device housing 101 may include parts to provide a light shield which shields light from the external of the monitoring device 100 from penetrating into the interior of the device housing 101. Moreover, the monitoring device 100 comprises a control circuit 102 that is connected to the light source 70 and via the socket 103, the electrical contacts 89, and the conducting lines 20 to 27 to the at least one photodetector 15. The control circuit 102 is configured to detect whether the test strip cassette 1 is inserted or not and to provide an enable signal, when the test strip cassette 1 is inserted. Additionally, the monitoring device 100 may comprise an interface 104 connected to the control circuit 102 for providing information gained by the monitoring device 100 to an external device. The monitoring device 100 may also comprise a display 105 for displaying information gained by the control circuit 102. For example, the display 105 may display the enable signal to indicate to a user that the sample liquid can be applied to the test strip 10. Moreover, the display 105 displays the result of the test. The monitoring device 100 may comprise a power supply 106 such as a battery. Additionally, the monitoring device 100 may comprise a user interface 107 such as a button to start the measuring process.

The monitoring device 100 is free of a complicate mechanical switch for detecting the test strip cassette insertion into the monitoring device 100. The test strip cassette 1 will have electrical connection (termination) corresponding to the various signal and power lines on the carrier 19. The electronics on the monitoring device 100 will be able to detect the insertion of the test strip cassette 1 by detecting the spectral sensor 15 on the $I^2C$ lines and consequently enable the monitoring device 100 in a way that is ready to run measurements.

Optionally, a protection system can be implemented on the $I^2C$ line to avoid that counterfeiting test strip cassettes are inserted. The test strip cassette 1 may be masked in a way that only electronic reading is allowed. This can be done by completely covering the area where the photodetectors 15, 62, 63 are located or both side leaving only a small slit to allow the impinging light to reach the at least one active area 15.

The test strip cassette 1 may be configured to perform reactance measurements. To achieve proper measurements the test strip cassette 1 may be equipped with a qualified spectrometer photodetector integrated circuit.

Figure 5:
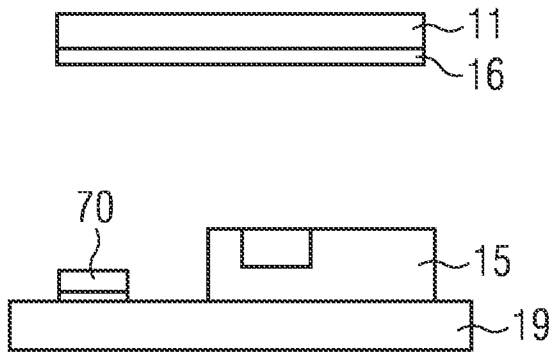
FIGS. 5 and 6 show exemplary arrangements according to an embodiment.

In FIG. 5 an alternative arrangement is shown in a cross-section. Some components of the test strip cassette 1 or the monitoring device 100, respectively, are omitted for ease of illustration. In the example according to FIG. 5 the light source 70 is arranged on the carrier 19 next to the photodetector 15. The light source 70 can be arranged near the photodetector 15, which means that a distance between these components can be less than 10 mm, less than 5 mm or even less than 2 mm. The light source 70 may be mounted on the carrier 19 by soldering and/or by an adhesive. A wiring (not shown) for the light source 70 can be arranged on the carrier 19 as well and may be electrically connected to the electrical contacts 89. Both the light source 70 and the photodetector 15 are aligned with the active area 16 of the test strip 10. In the shown example, the active area 16 is arranged on a side of the test strip 10 that faces the carrier 19.

Figure 6:
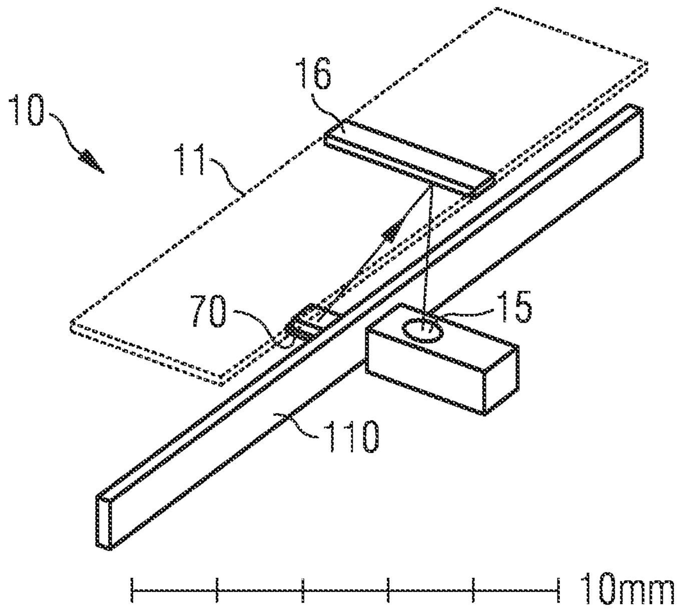

FIG. 6 shows a perspective view on the exemplary arrangement according to FIG. 5. Further, it shows a light barrier 110 separating the light source 70 from the photodetector 15. Light emitted by the light source 70 hits the active area 16 on the test strip 10. Light reflected or emitted by the active area 16 is detected by the photodetector 15. The light source 70 and the photodetector are approximately in the same plane; the active area 16 is above the plane. The light barrier 110 protects the photodetector 15 from direct light generated by the light source 70. The light source 70 may be a light-emitting diode, e.g. emitting white light or broad band white light. An example of a light path is also shown in FIG. 6.

Figure 7:
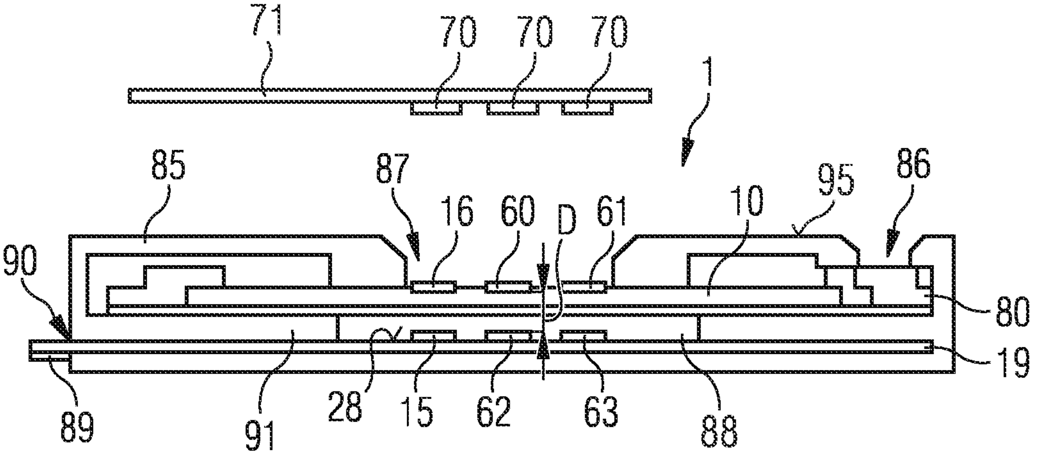
FIG. 7 shows an arrangement according to an embodiment.

FIG. 7 illustrates the test strip cassette 1 according to FIG. 1A. Furthermore, it shows a further carrier 71, where a plurality of light sources 70 are arranged on. For example and as shown in FIG. 7, the number of light sources can match the number of the active areas 16, 60, 61 and/or the number of photodetectors 15, 62, 63. The further carrier 71 including the light sources 70 may be part of the monitoring device 100 or another external device. The light sources 70 are aligned with the second opening 87. It can be seen that in the shown example the first opening 86 and the second opening 87 are arranged on a same side, i.e. the upper side of the housing 85. In the vertical direction z the test strip 10 is arranged between the upper side 95 of the housing and the carrier 19. Moreover, it can be seen that the active areas 16, 60, 61 are arranged on a side of the test strip 10 that faces away from the carrier 19.

Figure 8:
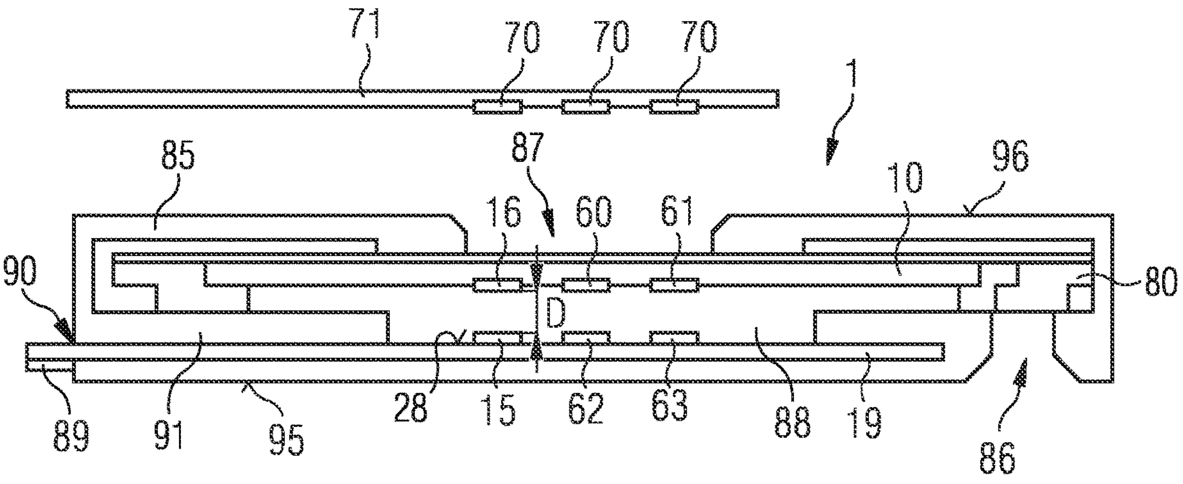
FIG. 8 shows an arrangement according to a further embodiment.

FIG. 8 shows an alternative arrangement, where the first opening 86 and the second opening 87 are arranged on different sides of the housing 85. The first opening 86 is arranged on the upper side 95 of the housing 85, while the second opening 87 is arranged on a lower side 96 of the housing 85 (the housing 85 is shown upside down). The test strip 10 is arranged in this example between the lower side 96 of the housing 85 and the carrier 19. Further, it can be seen that the active areas 16, 60, 61 are arranged on a side of the test strip 10 that faces the carrier 19. Again, the test strip cassette 1 is shown in its positional relation to a further carrier 71 comprising light sources 70, which may be part of a monitoring device 100 (not shown).

Figure 9:
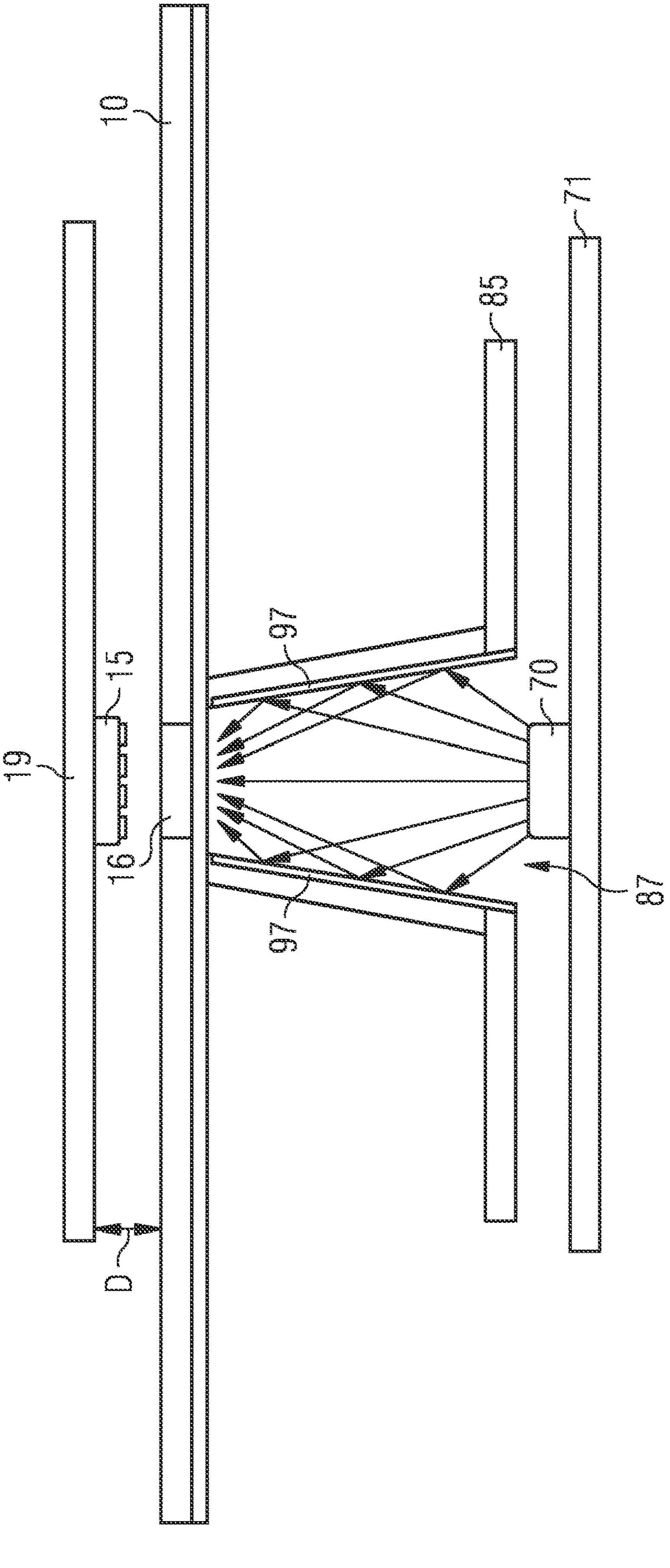
FIG. 9 shows an arrangement according to a further embodiment.

In FIG. 9 a further possible arrangement is shown in a cross-section. Some components of the test strip cassette 1 or the monitoring device 100, respectively, are omitted for ease of illustration. In the example according to FIG. 9 the light source 70 is arranged on the further carrier 71 outside the test strip cassette 1. Thus, the test strip cassette 1 does not comprise the light source 70. FIG. 9 shows the second opening 87 defined by the housing 85 in more detail. It should be noted that the test strip cassette 1 may comprise more than one second opening 87. However, for ease of illustration only one second opening 87 assigned to one active area 16 is shown. The second opening 87 tapers towards the active area 16 on the test strip 10. This means that a diameter of the second opening is larger at an input side (where the light source 70 is arranged) and smaller at an output side (where the active area 16 is arranged). As shown, the shape of the second opening 87 may be conical. This means that the second opening may have the shape of a truncated cone or frustum. In other words, a sidewall of the second opening 87 may define a surface shell of a truncated cone. However, different shapes, e.g. a parabolic shape, are also possible. Light rays from the light source 70 can be coupled into the second opening under a wide angle. The light rays (indicated by arrows) are reflected at the sidewall of the second opening 87. Since the second opening 87 tapers towards the active area 16 the light rays are effectively collimated, so that an intensity of light at the active area 16 is increased. This effect can be enhanced, if the sidewall is coated with a reflective layer 97, as shown in FIG. 9. The light hits the active area 16 from one side of the test strip 10. At the other side of the test strip 10 the carrier 19 comprising the photodetector 15 is arranged. The photodetector 15 detects a color change of the active area 16. Due to the advantageous design of the second opening 87, the light intensity at the active surface 16 can be increased. Thus, the requirements for the distance D between the photodetector 15 and the active area 16 can be relaxed.

Figure 10:
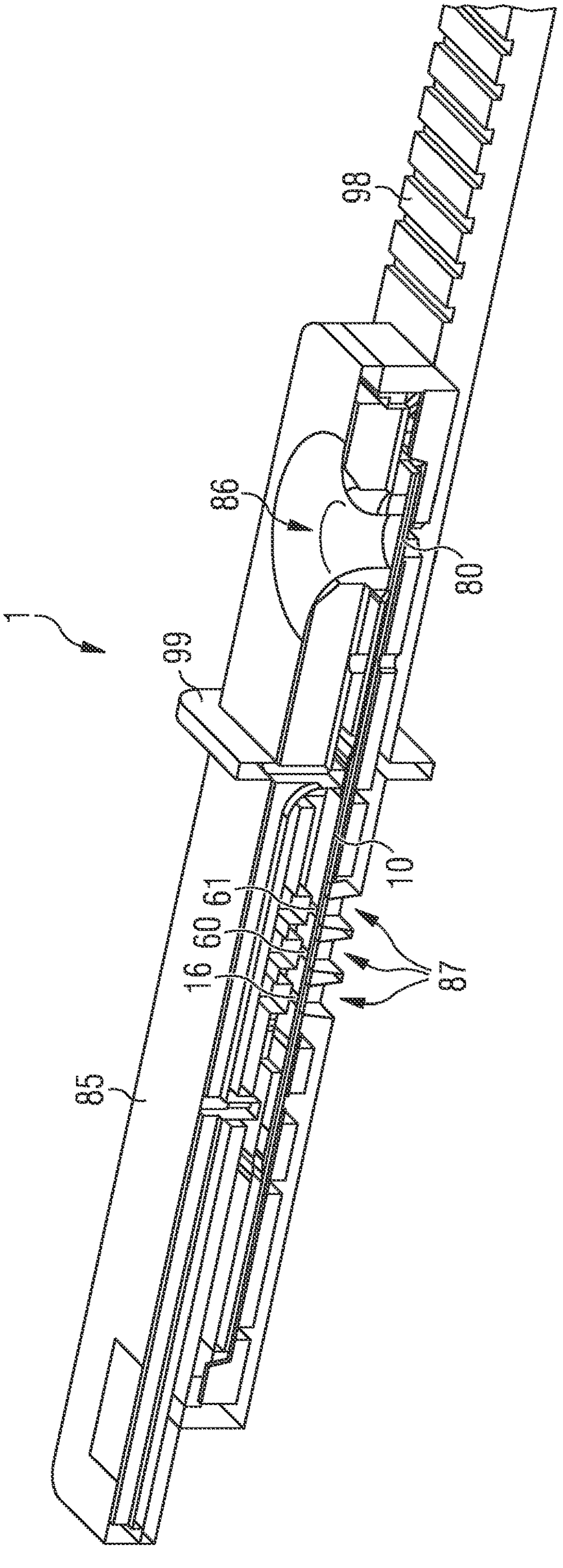
FIG. 10 shows an example of a test strip cassette.

In FIG. 10 a perspective view of an exemplary embodiment of the test strip cassette 1 is shown. Again, some components of the test strip cassette 1 are omitted for ease of illustration. The test strip cassette 1 according to Figure shows a handle bar 98 at one end of the test strip cassette 1 at the side of the first opening 86. The handle bar 98 can have a corrugated surface to ensure secure handling by a user by means of grip. The first opening 86 may be funnel-shaped to receive the liquid under test. Further, the housing 85 comprises a collar 99 that may be provided as mechanical barrier when the test strip cassette 1 is inserted into a monitoring device 100 (not shown). The collar 99 is implemented as protruding structure of the housing 85, so that it protrudes the rest of the housing 85 in lateral directions x, y and/or in the vertical direction z. The test strip 10 inside the housing 85 may comprise three active areas 16, 60, 61, as shown in the Figure. Each active area 16, 60, 61 is provided with a separate second opening 87, such that there is a one-to-one correspondence between active areas 16, 60, 61 and second openings 87. In other words, each active area 16, 60, 61 is assigned to one second opening 87. The second openings 87 may be implemented according to FIG. 9. Inside the housing 85 a plurality of slots 92, steps 93 and/or protrusions 94 are arranged (not explicitly labeled) to accommodate the test strip 10. Thus, the sample pad 80 and the active areas 16, 60, 61 can be aligned with the respective openings 86, 87 of the housing 85. The housing 85 also provides space for the carrier 19 with the photodetector (e.g. three photodetectors 15, 62, 63 corresponding to the three active areas 16, 60, 61). It is also possible that a power supply for the at least one photodetector 15 is arranged inside the housing 85. However, the power supply may also be arranged in the monitoring device (e.g. power supply 106 in FIG. 4). The housing 85 may consist of several parts that are assembled. For example, the housing 85, or parts of the housing 85, are made of an injection-molded material, e.g. plastic.

Figure 11:
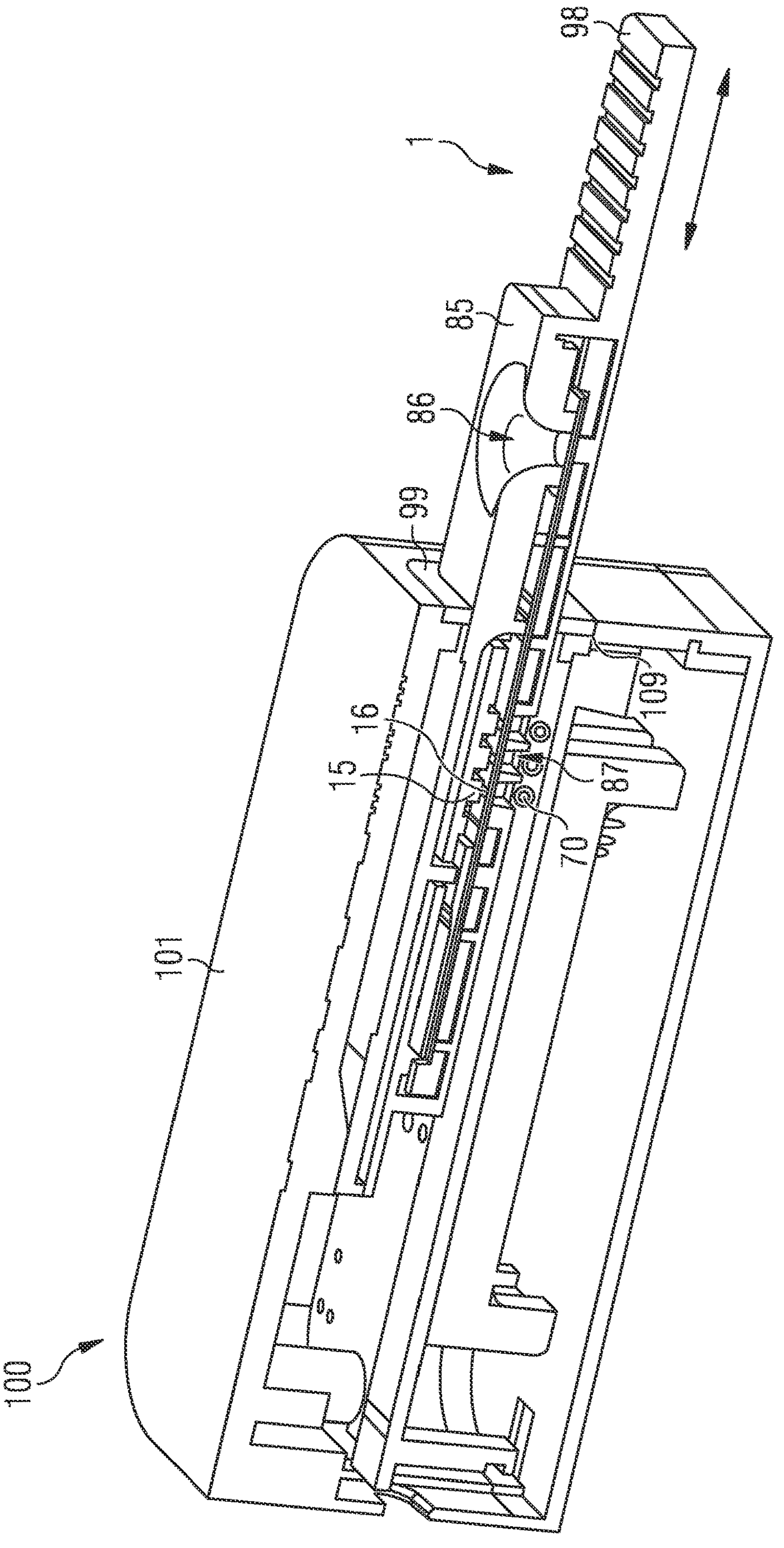
FIG. 11 shows an example of a test strip cassette and a monitoring device.

FIG. 11 shows the test strip cassette 1 according to FIG. 10 inserted in a monitoring device 100. Only the device housing 101 and light sources 70 inside the device housing 101 are shown of the monitoring device 100. The test strip cassette 1 can be inserted into and removed from the monitoring device 100, as indicated in the Figure. The device housing 101 may comprise a receiving structure 109 to accommodate the collar 99 of the test strip cassette 1. Thus, the test strip cassette 1 can be properly aligned with the monitoring device 100, such that the light sources 70 are aligned with the second openings 87. The device housing 101 may consist of several parts that are assembled. For example, the device housing 101, or parts of the device housing 101, are made of an injection-molded material, e.g. plastic.

The embodiments of the test strip cassette 1, the monitoring device 100 and the method of producing the test strip cassette 1 disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

The invention claimed is:

1. A test strip cassette, comprising:

a housing defining a first opening being configured to receive a sample liquid, the housing further defining a second opening configured to provide an optical path into the housing, and a spacer structure;

a carrier comprising at least one photodetector, the at least one photodetector being aligned with the second opening of the housing; and a test strip comprising a sample pad aligned with the first opening and at least one active area aligned with the second opening and the at least one photodetector, wherein the housing encloses the carrier and the test strip, such that the test strip is spaced from the carrier by the spacer structure and arranged between the second opening and the carrier.

2. The test strip cassette according to claim 1, wherein the test strip comprises a porous material which is configured to transfer the sample liquid from the sample pad to the at least one active area, and wherein the at least one active area is provided with a chemical substance which reacts with a component of the sample liquid.

3. The test strip cassette according to claim 1, wherein the at least one photodetector is arranged on a side of the carrier facing the test strip.

4. The test strip cassette according to claim 1, further comprising a third opening of the housing, electrical contacts of the carrier arranged beyond the third opening outside the housing, and conducting lines on or in the carrier electrically connecting contact areas of the at least one photodetector to the electrical contacts beyond the third opening.

5. The test strip cassette according to claim 4, wherein the conducting lines comprise a power supply line, a reference potential line and at least one bus line.

6. The test strip cassette according to claim 1, wherein the at least one photodetector is implemented as a spectral sensor that is configured to separately detect light in at least two different wavelength regions.

7. The test strip cassette according to claim 1, wherein a distance between the at least one active area and the at least one photodetector is between 0.3 mm and 5 mm.

8. The test strip cassette according to claim 1, wherein the test strip comprises at least two active areas and wherein the at least one photodetector comprises at least two pixels, each aligned with one of the at least two active areas, or a first photodetector is aligned with one of the at least two active areas and a second photodetector is aligned to another one of the at least two active areas.

9. The test strip cassette according to claim 1, wherein the first opening and the second opening are arranged on an upper side of the housing, wherein the test strip is arranged between the upper side and the carrier.

10. The test strip cassette according to claim 1, wherein the first opening is arranged on an upper side of the housing and the second opening is arranged on an opposite lower side of the housing, wherein the test strip is arranged between the lower side and the carrier.

11. The test strip cassette according to claim 1, wherein the at least one active area is arranged on a side of the test strip facing away from the carrier.

12. The test strip cassette according to claim 1, wherein the at least one active area is arranged on a side of the test strip facing the carrier.

13. The test strip cassette according to claim 1, further comprising a light source arranged on the carrier, wherein the light source is configured to emit light towards the at least one active area, and the at least one photodetector is configured to detect light reflected from the at least one active area.

14. The test strip cassette according to claim 1, wherein the second opening defined by the housing tapers towards the at least one active area of the test strip.

15. The test strip cassette according to claim 1, wherein a sidewall of the second opening defined by the housing is coated with a reflective layer.

16. A monitoring device, comprising:

the test strip cassette according to claim 1, a light source, and a control circuit connected to the photodetector and to the light source, wherein the test strip is located between the light source and the carrier comprising the at least one photodetector, or wherein the light source is arranged on the carrier of the test strip cassette.

17. The monitoring device according to claim 16, wherein the monitoring device is configured such that the test strip cassette is selectively insertable into and removable from the monitoring device.

18. The monitoring device according to claim 16, wherein the control circuit is configured to detect whether the test strip cassette is inserted or not and to provide an enable signal, when the test strip cassette is inserted.

19. A method for fabricating a test strip cassette, comprising:

providing a carrier comprising at least one photodetector;

providing a test strip comprising a sample pad and at least one active area;

providing a housing defining a first opening being configured to receive a sample liquid, the housing further defining a second opening configured to provide an optical path into the housing, and comprising a spacer structure; and assembling the housing, the test strip and the carrier such that the housing encloses the carrier and the test strip, the test strip being spaced from the carrier by the spacer structure and arranged between the second opening and the carrier, wherein the at least one photodetector, the at least one active area and the second opening are aligned to each other, and wherein the sample pad is aligned with the first opening of the housing.

20. A test strip cassette, comprising:

a housing defining a first opening being configured to receive a sample liquid, the housing further defining a second opening configured to provide an optical path into the housing, and a spacer structure;

a carrier comprising at least one photodetector, the at least one photodetector being aligned with the second opening of the housing; and a test strip comprising a sample pad aligned with the first opening and at least one active area aligned with the second opening and the at least one photodetector, wherein the housing encloses the carrier and the test strip, such that the test strip is spaced from the carrier by the spacer structure and arranged between the second opening and the carrier, wherein an inside surface of the housing comprises at least one of a step, slot and/or protrusion to receive the test strip and the carrier in predetermined positions to provide positional alignment between the second opening, the at least one active area and the at least one photodetector.

* * * * *